3,514,197
REWINDING MEANS IN A MAGAZINE TYPE MOTION PICTURE CAMERA

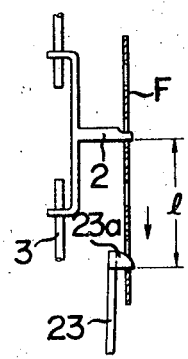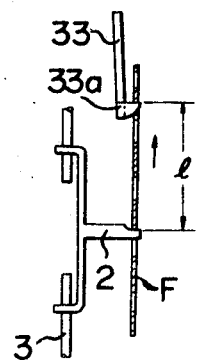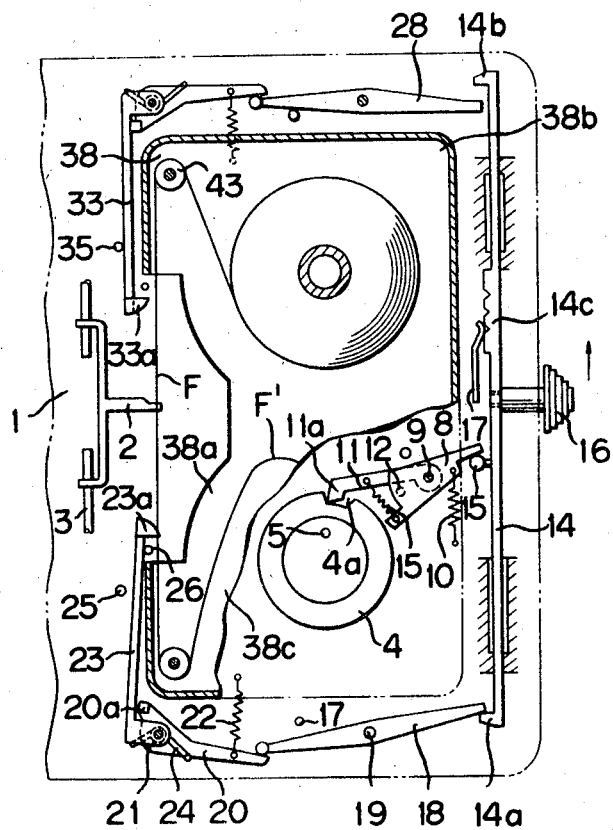

Koji Sho, Yokohama-shi, Japan, assignor to Nippon Kogaku K.K., Tokyo, Japan, a corporation of Japan
Filed Nov. 16, 1967, Ser. No. 683,583
Claims priority, application Japan, Nov. 19, 1966 (utility model), 41/106,101; Dec. 12, 1966, 41/82,096
Int. Cl. G03b 21/36
U.S. Cl. 352—91          7 Claims

ABSTRACT OF THE DISCLOSURE

This invention provides a rewinding means used for film magazines equipped with means for preventing the reverse movement of the film at the core of the film take-up, to enable double exposure or reverse photography. According to this invention a predetermined amount of the film is loosely fed on the take-up core of the magazine in advance by operating the feed claw while the rotation of the take-up core is stopped, and then this loosely stored film is rewound. Furthermore, according to the invention, auxiliary pawls are provided for regulating the rest position of the film, which otherwise tends to be turned back during the rewinding process.

---

The present invention relates to rewinding means in a magazine type movie camera.

Some of the conventional film magazines such as Kodapak type Super-8 film magazine having the opening for exposure in itself being provided with ratchet or friction means at the core of the take-up side of the film for preventing the reversal movement of the film for avoiding the slackening of the film within the magazine. This slackening of the film is caused by the structure that the film to be fed is forced into the narrow chamber of the magazine by the feed claw fitted to the film at the opening portion of the magazine, and when the film is slackened and is staying in the take-up chamber loosely, the film forced into the take-up chamber is again pushed back so that the rest position of the image becomes remarkably unstable, and for this reason the means for preventing the reversal movement of the film is provided on the core.

In the motion picture camera which uses such a magazine as above, it is impossible to carry out the rewinding operation of the film, and therefore double exposure or reverse photography or the like cannot be done or is difficult to do, and is very inconvenient.

It is therefore the main object of the present invention for enabling double exposure or reverse photography or the like which could not be possible or would be difficult to do according to the prior art when using the film magazine equipped with means for preventing the reverse movement of the film at the core of the take-up side.

For this purpose, according to one aspect of the present invention, a predetermined amount of the film is loosely fed on the take-up core of the magazine in advance by operating the feed claw at the opening portion for exposure while stopping the take-up operation of the take-up core, and then by rewinding the same it is possible to rewind a predetermined amount of the film.

It is another object of the present invention to provide means for controlling or stabilizing the rest position of the image during above mentioned rewinding process.

For this purpose, according to another aspect of the present invention, auxiliary pawls are provided at the exposure opening which engage feeding holes in the film, respectively, when the film is in the state of being loosely fed into the film supply chamber or film take-up chamber of the magazine.

The present invention will now be more apparent from the following explanation with respect to an illustrative embodiment embodied above mentioned both aspects of the invention and shown in the attached drawing in which.

Figure 1:
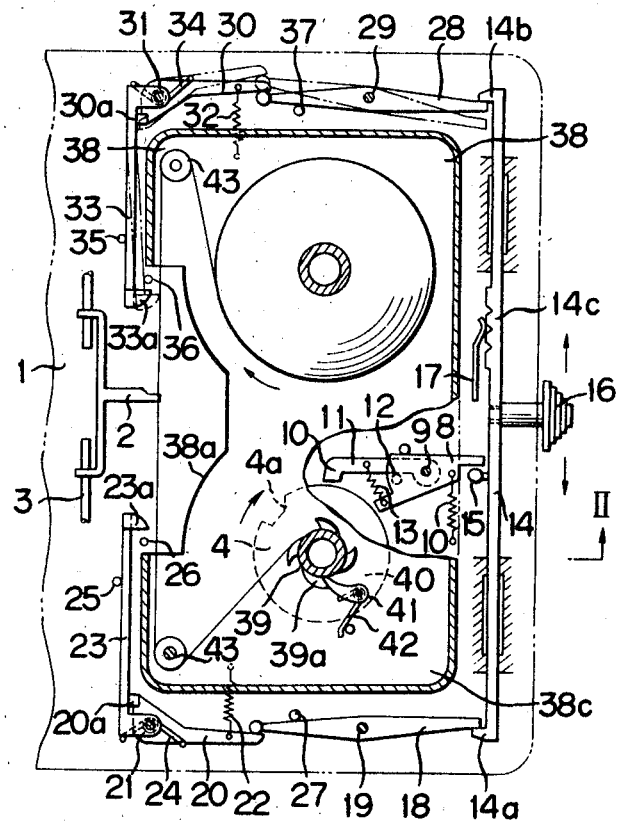
FIG. 1 shows a principal portion of an embodiment in its normal phototaking state illustrative of two aspects according to the present invention.
Figure 2:
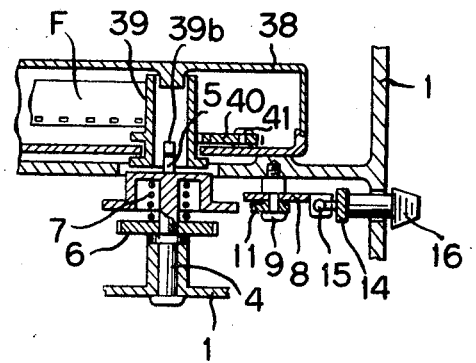
FIG. 2 shows a cross section seeing from the arrow of II.

FIGS. 3A and B show the operations of the feed claw and the respective additional pawls; and FIG. 4 shows the same as in FIG. 1 except that in FIG. 4, the rotation of the take-up shaft is prevented.

In the drawing, 1 is the main body of a motion picture camera of the aforesaid type, 2 and 3 constitute a part of conventional reversible film feeding device wherein 2 is a feed claw and 3 is a guide pin thereof, and it is so devised that the feed claw 2 is fitted into the feed perforation in the film F within the opening portion 38a for exposure of the magazine as described hereinafter; 4 is a film take-up shaft mounted rotatably onto the body 1, and on the external periphery of the round plate at the upper end thereof, a cut portion 4a is provided; 5 is a clutch pin fixed on the top of the film take-up shaft 4; 6 is a driving gear fitted rotatably on said take-up shaft 4, and the rotation thereof is transmitted to the take-up shaft 4 through a friction spring 7. The gear 6 is rotated by the conventional shutter driving means (not shown) so that the film can be taken up slightly faster than the transfer speed of the film by the feed claw. Element 8 is an interlocking plate supported rotatably by a shaft 9, and is biased in the clockwise direction by a spring 10; 11 is a detent lever, one end thereof is shaped in the form of a pawl 11a, and is rotatably supported by the shaft 9, and is interlocked to the interlocking plate 8 by a connecting pin 12 and a spring 13. Element 14 is an operation rod slidably guided in the up and down direction by the portions 14a' and 14b' fixed on the main body, and on both ends thereof, hook portions 14a and 14b are provided, and in the central portion thereof the portion 14c having three detent teeth for determining the lowering, intermediate, and elevating positions. Although not shown in the drawing, since it is not within the scope of the invention, there is provided conventional clutch or switch means for switching the feeding directions of the film. In interlocking with the operation of such clutch or switch means, when the rod 14 is in its intermediate or elevated position, the film is moved in the take up direction, while when the rod 14 is in its lowered position, the film is moved in the rewinding direction. The operation rod 14 is provided with a projection 15 which, when the rod is in its intermediate position as shown in FIG. 1 or in its lowered position, does not act on the lever 8, but, when the rod 14 is moved to its elevated position as shown in FIG. 4, acts on the lever 8 to move it anticlockwise direction. Element 16 is a knob formed integral with the rod 14 to move the latter, 17 is a detent spring to engage with either one of the three detent teeth formed at the portion 14c, 18 is a lower side interconnecting lever rockably supported around a pin 19 and one end of the lever 18 is engaged with the hook portion 14a of the rod 14. Rotatably supported on a shaft 21 within the camera body is a lever 20 provided with a projection 20a engaged with an auxiliary pawl member 23 and the other end of the lever 20 engages with the interconnecting lever 18, the lever 20 being always biased in anticlockwise direction by a spring 22. The pawl member 23 aids to control the rest position of the film or image by means of a pawl element 23a provided at the upper end of the pawl member 23, which is rotatably supported by the shaft 21 and biased by a weak spring 24 so as to interlock with the lever 20. The pawl element 23a is formed so as to enable to fit with one of the feed perforations of the film F within the opening 38a, and the distance $l$ between the feed claw 2 and auxiliary pawl element 23a is slightly less than $n$, which is an integer, times the pitch P of the feed perforations of the film F, namely, $l=nP-\epsilon$, where $\epsilon$ is made sufficiently small. Pins 25 and 26 restrict the rocking motion of the lever 23 in the anticlock and clockwise directions, respectively, while pin 27 restricts the movement of the lever 18. Lever 28 is an upper side interconnecting lever rockable around a pin 29, 30 is a lever rotatable around a shaft 31 under the action of a spring 32, and a member 33 is an auxiliary pawl member having a pawl element 33a aiming to control the film rest position during reverse film feeding operation by fitting in one of the feed perforations of the film F within the opening 38a. Spring 34 is a weak spring acting on the member 33 to incorporate with the lever 30. Pins 35 and 36 are for restricting the movement of the member 33, while pin 37 is to restrict the movement of the lever 28. The structural functions of the members from 28 through 37 are the same as in the case of the members from 18 through 27.

A film magazine 38 containing the film F is inserted in the camera body, an opening 38a being provided in the front portion thereof for film exposure, in which the upper space is shaped into the feed-chamber 38b, and the lower space is shaped into the take-up chamber 38c. Instead of these upper and lower chambers, the present invention may well be adopted for the chambers of the type separated into left and right spaces. Element 39 is a core of the film take-up having several ratched gears 39a on the external periphery of the lower portion for preventing the reversal winding, and a groove 39b is formed on the lower end surface of the core 39 and fitted with the clutch pin 5 planted on the top of the film take-up shaft 4. Element 40 is a ratchet pawl supported by a shaft 41, and is always enforced in the clockwise direction by a spring 42, and 43 are a pair of guide rollers provided within the magazine for forming the film path.

The following is an explanation of the functions of the invention.

IN CASE OF NORMAL PHOTOGRAPHY

The knob 16 is placed on the intermediate position (the position as is shown in FIG. 1), and normal photography is carried out, then the film feeding claw 2 feeds the film F in the take-up direction at the opening portion 38a of the magazine, and the take-up shaft 4 which is rotated by the driving gear 6 rotates the core 39 on the take-up side in the clockwise direction through the clutch pin 5 and the groove 39b, and takes up the film without slackening the supplied film, and therefore photography can be carried out in such a state that the film rest position is stabilized.

IN CASE OF DOUBLE EXPOSURES

Firstly and in case that the film is fed while the take-up operation of the core 39 is stopped, it is operated as follows: the knob 16 is pushed upwardly, the lower hook portion 14a of the operation rod 14 rotates the lower interconnecting lever 18 in the counter clock-wise direction as is shown in FIG. 4 and as a result, the lever 20 is rotated in the clock-wise direction against the force of the spring 22. Therefore, the auxiliary pawl member 23 for regulating the film rest position is rotated in the clockwise direction by the force of the twisting weak spring 24, so that the pawl element 23a is in the position engaging a perforation of the film F at the opening portion 38a of the magazine. The interlocking plate 8 is rotated in the counter clock-wise direction with the projection 15 along with the elevation of the operation level 14, and therefore the front end 11a of the detent lever 11 engages the round plate portion of the take-up shaft 4 by the force of the spring 13, and falls into the cut portion 4a directly or falls into the cut portion 4a after the take-up shaft 4 is slightly rotated. As the result, the rotation of the take up core 39 of the magazine is stopped through pin 5, and groove 39b, however, for the purpose to stop the rotation of the take up core 39, instead of stopping the rotation of the take up shaft 4, suitable clutch mechanism may well be adopted for preventing the transmission of the rotation to the take up core 39. When photography is carried out in this state, the feeding claw 2 feeds the film F in the take-up direction at the opening portion 38a of the magazine in the same manner as in the normal photography. Thus, the rotation of the take-up core of the magazine is stopped, and therefore the supplied film is stored loosely into the take-up chamber 38c. The loosely stored film F' (FIG. 4) possesses a tendency to turn back to the original state, but the backward movement of this fed film is prevented by the auxiliary pawl 23a fitted to the perforation of the film even when the feeding claw 2 escapes from the perforation of the film. In other words, the film rest position during the first film feeding operation is stabilized. During this time the driving gear 6 keeps on rotating same and the friction spring 7 because since the shaft 4 is stopped by the engagement with the detent lever 11.

Next, in case of that the stored film F' is rewound, the operation knob 16 is pushed downwards and the upper hook portion 14b of the operation rod 14 rotates the upper interconnecting lever 28 in the clock-wise direction as is shown in the two dotted lines of FIG. 1, and therefore the auxiliary pawl 33a for regulating the film rest position during reverse film running is in the position fittable to a perforation of the film F at the opening portion 38a of the magazine as is shown by the two dotted lines of FIG. 1. Thus, the projection 15 on the operation rod 14 and the lower hook portion 14a are lowered from the intermediate position, and therefore the interlocking plate 8 and the preventing pawl 11 are turned back to the position by the spring 10 and the connecting pin 12 as is shown in FIG. 1, and in the interlocking relation therewith, the not shown clutch or switch operates to reversely operate the feeding claw 2, and at the same time, the members 18, 20 and 23 for regulating the film rest position during advance operation are turned back to the original position as shown in FIG. 1. When the feeding claw 2 is moved in the reverse direction in this state, the stored film is taken back on the feeding chamber 38b from taking chamber 38c. In this case the operation of the auxiliary pawl 33a performs such a function as to prevent the film going back to the previous position when the feeding claw 2 escapes from the perforation of the film as in the case of said auxiliary pawl 23a. When the operation for rewinding the predetermined amount of the film is finished, the operation knob 16 is again set on the intermediate position and the second exposure operation is carried out, making it possible to carry out the overlapping photography.

As has been described so far, when the present invention is used, it is possible to rewind a predetermined amount of film in a movie camera in which the unrewindable film magazine is used, and there is another advantage that it is possible to satisfactorily carry out photographic techniques such as double exposure or reversal photography or such like techniques related to film rewinding since the stability of the film image can be excellently retained even when the film is at least pushed in such a state that the film is loosely stored within the magazine regardless of the positive or reverse rotation of the film.

The present invention should not be limited to the embodiment but there are many modifications within the scope of the invention as defined in the appended claims.

What is claimed is:

1. In a motion picture camera using a film magazine having an opening for exposure and equipped with means for preventing the reverse movement of a film at the film take-up core, a structure for film rewinding comprising film feed means engageable with a perforation in the film within the exposure opening; means equipped in the camera for optionally stopping the rotation of the film take-up core of the film magazine while the feed means is operated to loosely feed and store a predetermined amount of film in the film take-up chamber of the magazine.

2. Structure of film rewinding according to claim 1 comprising means for returning said stored film back into the film supply chamber of the magazine.

3. In a motion picture camera using a film magazine having an opening for exposure and equipped with means for preventing the reverse movement of a film at the film take-up core, a structure of film rewinding comprising a feed claw member engageable with a perforation in the film within the exposure opening; means equipped in the camera for optionally stopping the rotation of film take-up core of the film magazine while the feed claw member is operated, to loosely feed and store a predetermined amount of film in the take-up chamber of the magazine; and means for reversing the movement of the feed claw for returning said stored film back into the film supply chamber of the magazine.

4. In a motion picture camera using a film magazine having an opening for exposure and equipped with means for preventing the reverse movement of a film at the film take-up core, a structure for film rewinding comprising film feed means engageable with a perforation in the film within the exposure opening; means equipped in the camera for optionally stopping the rotation of the film take-up core of the film magazine while the feed means is operated to loosely feed and store a predetermined amount of film in the film take-up chamber of the magazine; and auxiliary registering means for regulating the rest position of the film equipped at the location corresponding to the exposure opening of the magazine.

5. In a motion picture camera using a film magazine having an opening for exposure and equipped with means for preventing the reverse movement of a film at the film take-up core, a structure of film rewinding comprising a feed claw engageable with a perforation in the film within the exposure opening; means equipped in the camera for optionally stopping the rotation of the film take-up core of the film magazine while the feed claw is operated, to loosely feed and store a predetermined amount of film in the film take-up chamber of the magazine; means for returning back said stored film into the film supply chamber of the magazine; and at least one auxiliary pawl means for regulating the rest position of the film which cooperates with one of the perforations in the film within the exposure opening when the film is fed loosely into the magazine.

6. In a motion picture camera using a film magazine having an opening for exposure and equipped with means for preventing the reverse movement of a film at the film take-up core, a structure of film rewinding comprising film feed means engageable with a perforation in the film within the exposure opening; means equipped in the camera for optionally stopping the rotation of the film take-up core of the film magazine while the feed means is operated, to loosely feed and store a predetermined amount of film in the film take-up chamber of the magazine; means for returning said stored film back into the film supply chamber of the magazine; auxiliary registering means equipped at the location corresponding to the exposure opening of the magazine for regulating the rest position of the film; and interconnecting means for simultaneously making operative both said means for stopping the take-up core and said auxiliary registering means.

7. In a motion picture camera using a film magazine having an opening for exposure and equipped with means for preventing the reverse movement of a film at the film take-up core, a structure of film rewinding comprising film feed means engageable with a perforation in the film within the exposure opening; means equipped in the camera for rotating the film take-up core of the magazine; means engageable or disengageable with the take-up core rotating means for optionally stopping the rotation of the film take-up core of the film magazine while the feed claw is operated, to loosely feed and store a predetermined amount of film in the film take-up chamber of the magazine; means for returning back said stored film into the film supply chamber of the magazine; a pair of auxiliary registering devices for regulating the rest position of the film which cooperate with the perforation in the film within the exposure opening; and control means for selectively actuating one of the auxiliary registering devices when the film is fed into the film take-up chamber of the magazine, the other when film is returned back into the film supply chamber of the magazine.

References Cited

UNITED STATES PATENTS

| | | | |
|---|---|---|---|
| 1,181,478 | 5/1916 | Price | 352—180 |
| 2,117,694 | 5/1938 | Becker | 352—217 |
| 2,955,510 | 10/1960 | Heinz. | |
| 3,425,776 | 2/1969 | Mayr et al. | |
| 2,422,815 | 6/1947 | Baia | 352—91 |
| 3,049,048 | 8/1962 | Miyauchi | 352—91 |
| 3,425,776 | 2/1969 | Mayr et al. | |

JULIA E. COINER, Primary Examiner

U.S. Cl. X.R.

352—72, 124, 160, 173